United States Patent [19]

Pugh

[11] Patent Number: 5,370,418
[45] Date of Patent: Dec. 6, 1994

[54] INTEGRATED CHASSIS AND COMPRESSED GAS FUEL SYSTEM OF AN AUTOMOTIVE VEHICLE

[76] Inventor: Nicholas Pugh, 4820 E. Second St., #5, Long Beach, Calif. 90803

[21] Appl. No.: 154,495

[22] Filed: Nov. 19, 1993

[51] Int. Cl.⁵ .............................................. B60P 3/22
[52] U.S. Cl. .................................. 280/830; 280/831; 280/783; 180/311; 180/695
[58] Field of Search ................ 180/311, 314, 69.4, 180/69.5; 280/830, 831, 833, 834, 782, 783, 797, 798

[56] References Cited

U.S. PATENT DOCUMENTS

| | | | |
|---|---|---|---|
| 689,001 | 12/1901 | Hill | 280/795 |
| 1,343,682 | 6/1920 | Richmond | 280/782 |
| 1,789,238 | 1/1931 | Lancia | 280/830 |
| 1,867,341 | 7/1932 | Werdehoff | 280/800 |
| 2,026,687 | 1/1936 | Lawrenson | 280/831 |
| 2,119,772 | 6/1938 | Buchanan | 280/831 |
| 2,122,656 | 7/1938 | Paget | 280/830 X |
| 2,297,198 | 12/1938 | Borgward | 280/798 |
| 2,918,982 | 12/1959 | Vlachos | 180/304 |
| 3,287,058 | 1/1964 | Wells | 296/37.14 |
| 3,830,326 | 8/1974 | Hartung | 180/69.5 |
| 4,106,581 | 8/1978 | West et al. | 180/69.5 |
| 4,457,525 | 7/1984 | Tanaka et al. | 280/834 |
| 4,550,923 | 11/1985 | Ogawa et al. | 280/834 |

FOREIGN PATENT DOCUMENTS

| | | | |
|---|---|---|---|
| 3301235 | 7/1984 | Germany | 180/314 |
| 230486 | 12/1985 | Germany | 180/314 |
| 3743804 | 7/1989 | Germany | 180/69.5 |
| 241826 | 9/1990 | Japan | 280/831 |
| 1088958 | 4/1984 | U.S.S.R. | 180/69.5 |
| 1386493 | 4/1988 | U.S.S.R. | 280/831 |

OTHER PUBLICATIONS

Friedrich LanBermair, City Buses Driven By Natural Gas, M.A.N. Res. Eng. Mfg. (Germany) No. 3 Apr. 1972 pp. 12–15.

Primary Examiner—Richard M. Camby
Assistant Examiner—Kevin Hurley
Attorney, Agent, or Firm—Wenderoth, Lind & Ponack

[57] ABSTRACT

An integrated chassis and compressed gaseous fuel system of an automotive vehicle provide long-range fuel capacity for the automotive vehicle. The chassis is a support structure defining at least one cavity in which a respective tank of compressed gaseous fuel is accommodated. By so designing the chassis to specifically accommodate a discrete tank(s) of compressed gaseous fuel, a much larger volume of fuel can be stored in the vehicle than in the case where existing storage space, such as trunk space, in a conventional automobile is used to store the compressed gaseous fuel. Accordingly, the present invention greatly increases the range of automotive vehicles powered by compressed gaseous fuel.

13 Claims, 6 Drawing Sheets

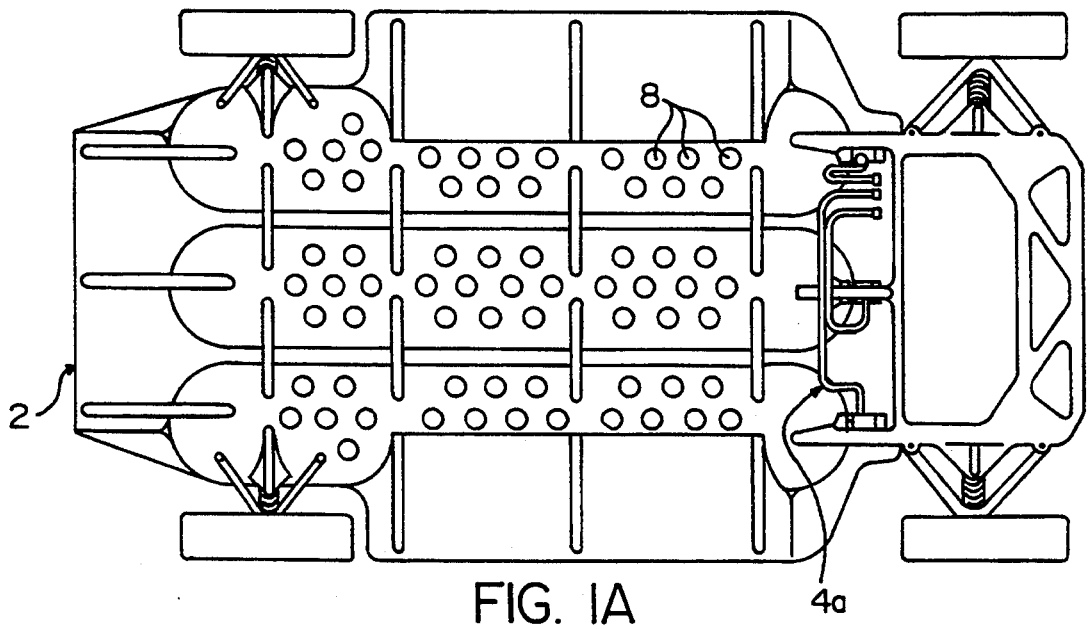
FIG. IA
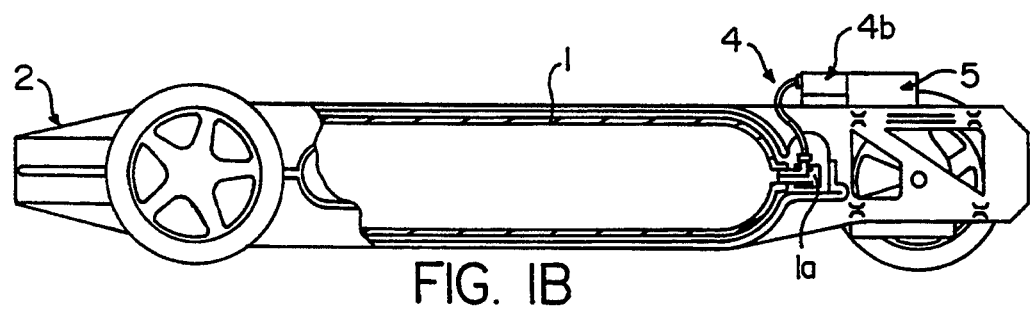
FIG. IB
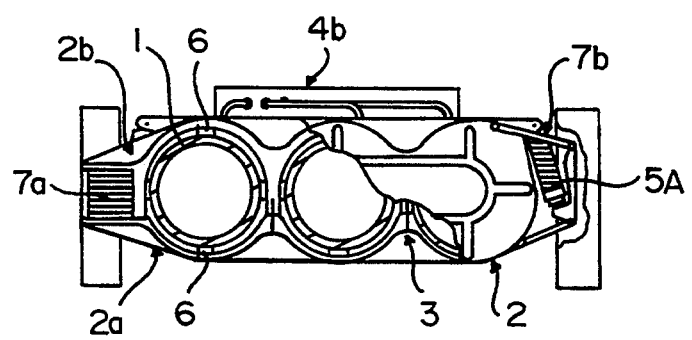
FIG. IC

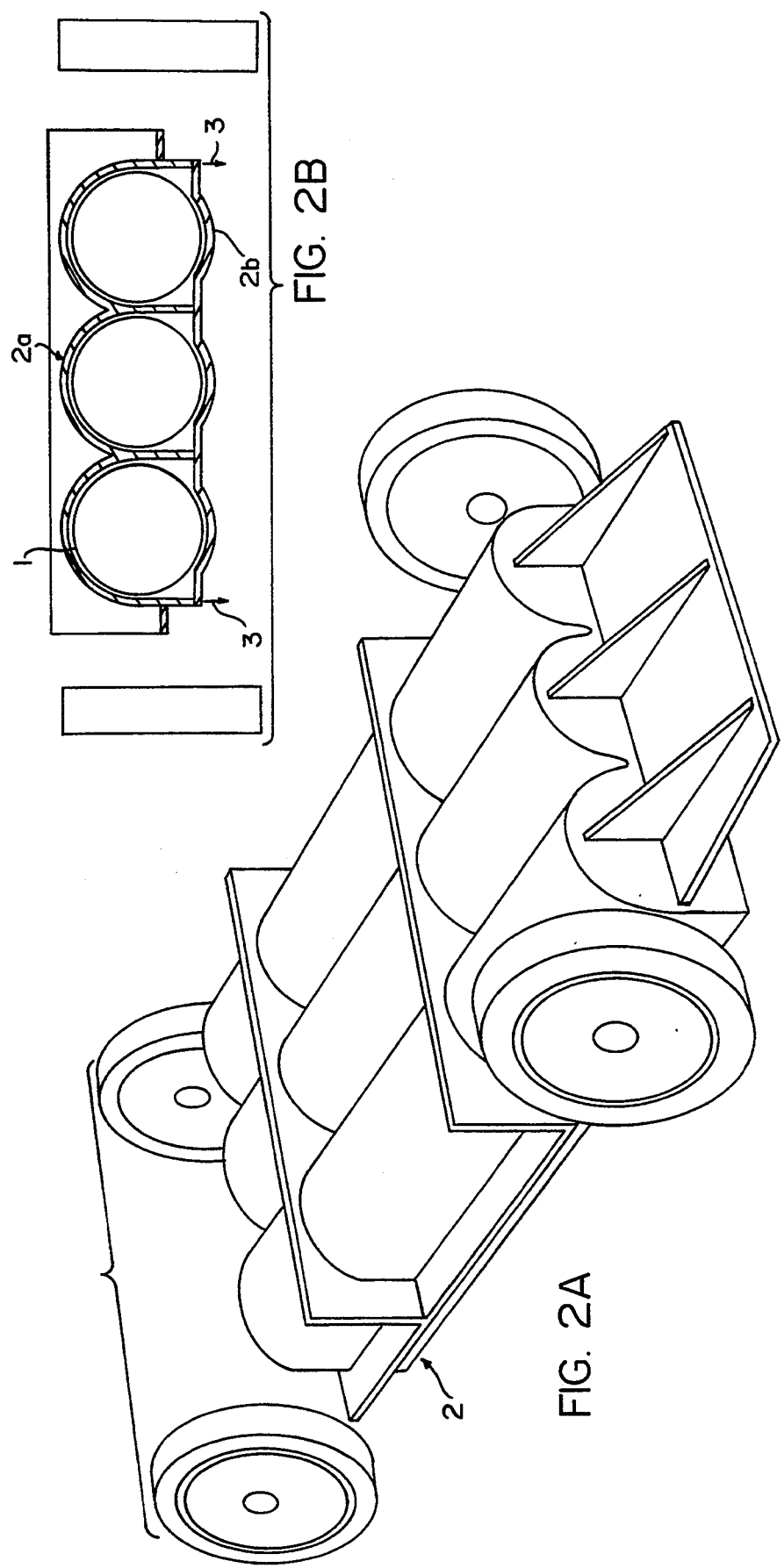

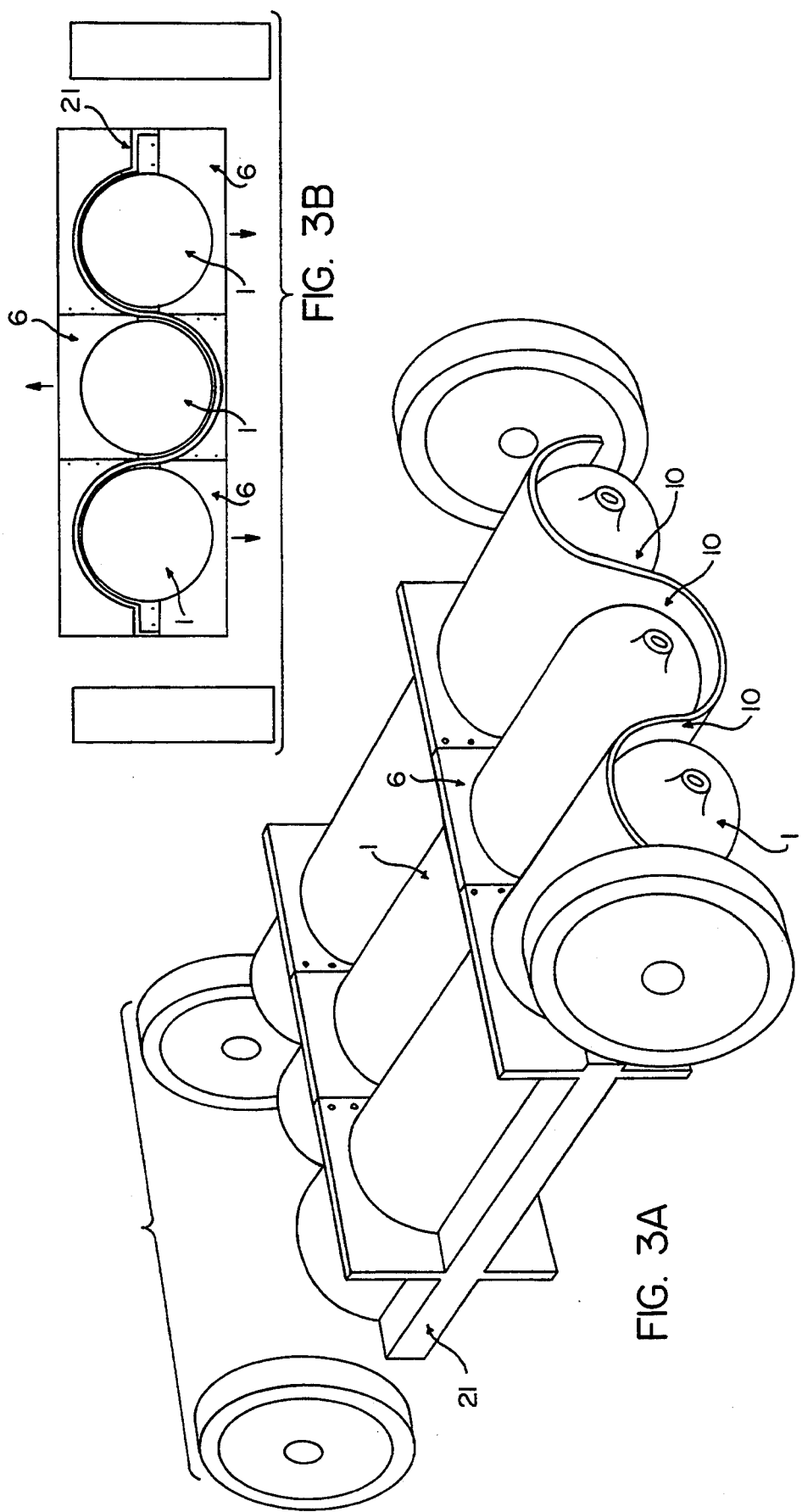

INTEGRATED CHASSIS AND COMPRESSED GAS FUEL SYSTEM OF AN AUTOMOTIVE VEHICLE

BACKGROUND OF THE INVENTION

1. Field of the Invention

The present invention relates to vehicles powered by compressed gaseous fuels, most notably natural gas, propane and hydrogen. More specifically, the present invention relates to a chassis of an automotive vehicle which is specifically adapted to accommodate pressure vessels in which the compressed gaseous fuel is stored.

2. Description of the Related Art

Chassis have traditionally been designed for use with gasoline tanks. This has, over the course of the development of the automobile created a certain standard architecture of the chassis that is suitable for gasoline storage. Although other fuels have been used to power automotive vehicles, these fuels have been mostly liquid (methanol, ethanol) and therefore, the above-mentioned standard architecture of the chassis does not need to be changed much to accommodate such liquid fuels. In the case of electric cars, some "ground up" vehicle development has resulted in modified chassis designs adapted to the specific characteristics of electric cars.

Compressed gaseous fuels (natural gas, propane and hydrogen) have been used to power automotive vehicles to some degree for decades. Customarily, existing cars designed to be powered by gasoline have been retrofitted for use with compressed gaseous fuels.

However, the properties of compressed gaseous fuels are fundamentally different than those of liquid fuels. The most notable aspect of these differences is that compressed gaseous fuels must be stored in pressure vessels hereinafter referred to as fuel cylinders. Further, compressed gaseous fuels occupy about three times the volume of gasoline in order to provide the same amount of power and range to an automobile engine.

Accordingly, the retrofitting of gasoline powered cars to accommodate compressed gaseous fuels is unsatisfactory because of the rather limited space available for storing the voluminous fuel cylinders. Even cars which have been so retrofitted have a limited mileage range. This limited mileage range is a serious impediment to wide-spread acceptance of compressed gaseous fuel-powered vehicles despite the positive aspects of such vehicles on the environment when compared to gasoline powered vehicles.

SUMMARY OF THE INVENTION

An object of the present invention is to provide an automotive vehicle which is powered by compressed gaseous fuel and can travel a substantially greater distance than a gasoline vehicle retrofitted to be powered by compressed gaseous fuel.

This object is achieved by basically designing the chassis of the automotive vehicle around the compressed gaseous fuel system to provide a gaseous fuel storage chassis.

More specifically, the chassis includes a support structure defining at least one cavity in which a fuel cylinder, namely one discrete tank of compressed gaseous fuel, is accommodated. Typically, the support structure is designed to accommodate a plurality of cylinders of compressed gaseous fuel.

The support structure is preferably a platform of sufficient structural rigidity. The platform can include first and second structural support members which are detachably secured to one another with the at least one tank of compressed gaseous fuel interposed therebetween. In the unlikely event that the tank of compressed gaseous fuel is damaged, it can be removed from the platform by detaching the first and second structural support members.

The chassis can also consist substantially of one structural support member in the form of a corrugated panel. The recesses defined between the adjacent corrugations accommodate the tank(s) of compressed gaseous fuel.

Alternatively, the rigid platform can comprise a cage formed of a plurality of struts with the tank(s) of compressed gaseous fuel fitted within the cage. Some of the struts may be detachable to allow the tank(s) to be removed therefrom.

Still further, the platform could consist of a one-piece shell or so-called "monocoque". In this case, an access door is connected to the shell to allow the tank(s) to be inspected.

In a more radical design, the tanks of compressed gaseous fuel form a load bearing portion of the platform. Specifically, suitable supports and elongate tensile members tie the tanks together and the resulting structure forms the chassis of the vehicle.

Finally, in each of the chassis designs, the tank(s) of gaseous fuel is left exposed to the ambient environment so that in the event of leakage, there will not be a buildup of the compressed gaseous fuel within the cavity formed by the chassis thereby decreasing the likelihood of an explosion. Further, the exposure of at least a portion of the tank(s) of gaseous fuel will allow for visual inspection of the integrity of the tank(s).

BRIEF DESCRIPTION OF THE DRAWINGS

These and other objects, features and advantages of the present invention will become clear by reviewing the following detailed description of the preferred embodiments of the invention made with reference to the drawings, in which:

FIG. 1A is a top view of a first embodiment of an integrated chassis and compressed gaseous fuel system according to the present invention;

FIG. 1B is a side view, partially broken away, of the same;

FIG. 1C is a front view, also partially broken away, of the same;

FIG. 2A is a perspective view of a second embodiment of an integrated chassis and compressed gaseous fuel system according to the present invention;

FIG. 2B is a cross-sectional view of the same;

FIG. 3A is a perspective view of a third embodiment of an integrated chassis and compressed gaseous fuel system according to the present invention;

FIG. 3B is a cross-sectional view of the same;

DETAILED DESCRIPTION OF THE PREFERRED EMBODIMENTS

Figure 4:
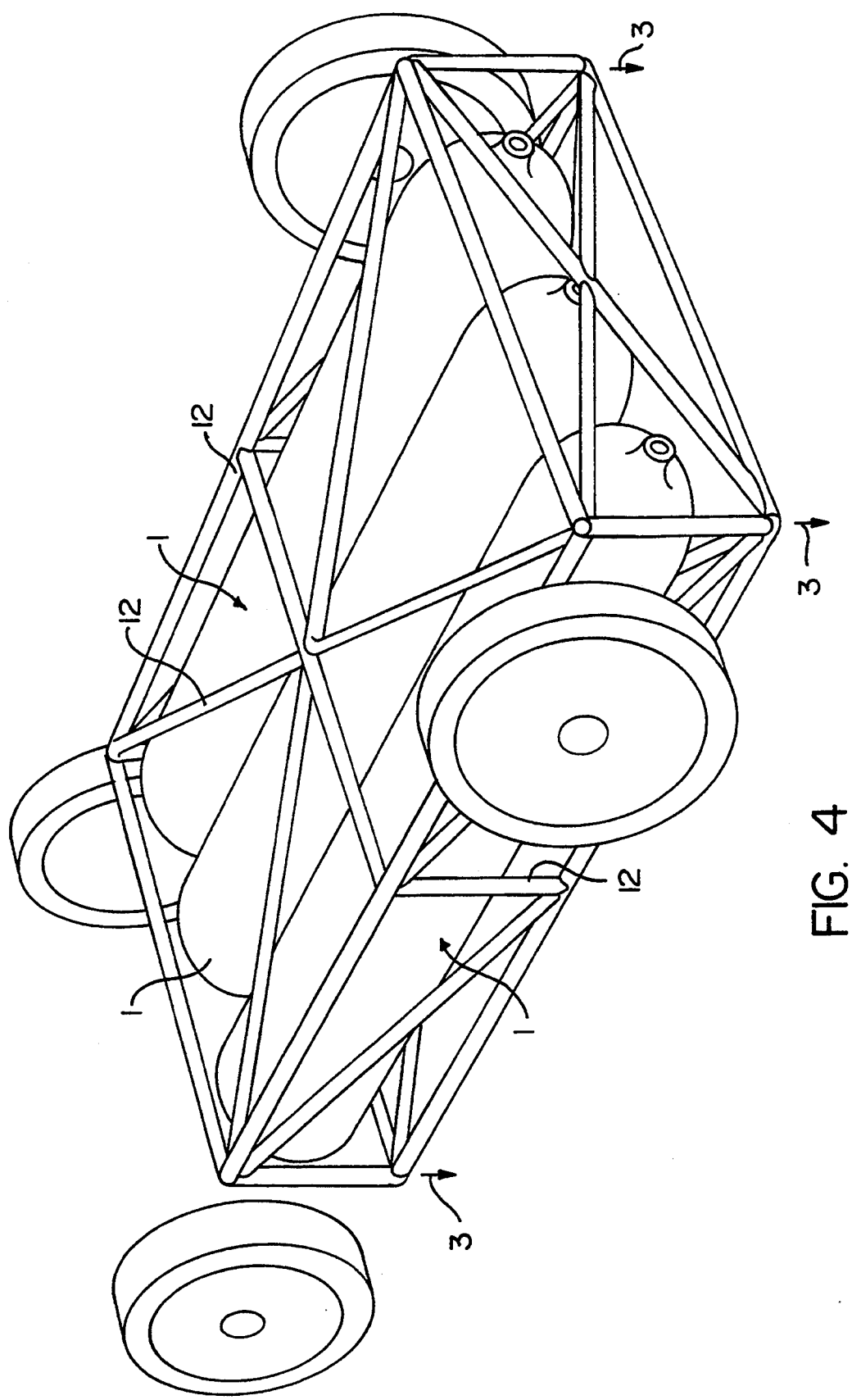
FIG. 4 is a perspective view of a fourth embodiment of an integrated chassis and compressed gaseous fuel system according to the present invention.

FIGS. 1A–1C are detailed diagrams showing a first embodiment of an integrated chassis and compressed gaseous fuel system according to the present invention. Reference numeral 1 designates a tank of compressed gaseous fuel such as compressed natural gas. The tanks 1 are discrete members meaning that they are self-contained and may be removed for replacement or maintenance as the case may be. Such tanks are well-known per se, such as those manufactured by CNG Cylinder Company of Long Beach, Calif. These tanks (pressurevessels) are made of a composite or aluminum overwrapped with the composite to provide a service pressure of 3000 or 3600 PSI. The volume of the tanks used in the present invention can range anywhere from approximately 100 to 225 liters at service pressure. As is clearly shown in the drawing, the tanks extend longitudinally of the chassis over a substantial portion of the chassis, namely approximately 3/5 of the length of the chassis or more.

The chassis of the vehicle consists of a support structure 2. The term "support" will be used in the specification to refer to the function of the chassis of supporting the tanks 1 of compressed gaseous fuel and/or supporting the body of the vehicle.

As shown best in FIG. 1C, the support structure 2 defines three cavities in which the tanks 1 of compressed gaseous fuel are respectively disposed. More particularly, the support structure 2 is a rigid platform including first 2a and second 2b structural support members (plates) detachably secured to one another by bolts 3. These plates forming the rigid platform can be made of various materials, such as aluminum, steel, reinforced plastics or composites, as desired to impart the necessary structural rigidity to the platform. Each of the structural support members 2a and 2b have a plurality of recesses which confronts the other of the support members. When the support members 2a, 2b are fastened together by the bolts 3, the recesses collectively form the cavities in which the tanks 1 are accommodated. Reference numeral 6 designates brackets which hold the fuel tanks 1 in position. The brackets are designed to conform with NFPA 6 G-Force specifications.

The tanks 1 will practically only be removed from the support structure 2 by detaching the lower structural support member 2a from the upper structural support member 2b when one of the tanks 1 has been damaged or otherwise needs to be replaced. The tanks can be refilled by a compressor, as is well-known, while in the support structure 2 as will be described below with reference to FIGS. 1A and 1B.

Reference numeral 4 designates a fuel feed system which connects the tanks 1 to the internal combustion engine 5. Stainless steel fuel lines 4a of the system extend between swagelock valves 4a of the tanks and swagelock fitting of an engine interface 4b of the system, such as a gaseous fuel injection system manufactured by Stewart & Stevenson of Commerce City, Colo. Appropriate feed lines and valving (not shown) are connected to a NGV-1 receptacle (also not shown) exposed at the side of the vehicle whereby the tanks may be refilled.

Incidentally, reference numeral 7a designates a crushable side impact absorber of an integrated foam or honeycomb structure interposed between two flanges of the upper structural support member 2a. Reference numeral 7b designates a standard A-arm suspension by which the tires are mounted to the chassis via a shock absorber SA.

As also shown in FIG. 1A, the chassis, and in this case the lower structural support member 2a, defines a plurality of holes 8 therein which expose each tank 1 to the ambient environment. In the event that one of the tanks develops a hairline fracture which allows the compressed gas to leak from the tank, the leaking gas can be dispersed through the holes 8 and will not build up within the cavity of the chassis in which the tanks are accommodated. By so allowing for the leaking gas to be dispersed to the ambient environment, the possibility of an explosion is alleviated. The holes also allow for visual inspection of the tanks without the necessity of detaching the structural support members 2a, 2b.

FIGS. 2A and 2B show a similar two-piece platform with the first 2a and second 2b structural members being detachably connected to one another as shown by the arrows in FIG. 2B. In this embodiment, it is substantially only the upper structural support member 2b which defines the cavities in which the tanks 1 of compressed gaseous fuel are stored.

Although in the embodiment of FIGS. 1A–1C and 2A–2B the support structure of the chassis is a "sandwich-type" platform having upper and lower structural support members detachably secured to one another, the lower structural support member can be omitted if the upper structural support member provides sufficient structural rigidity. Thus, as shown in the embodiment of FIGS. 3A–3B, the support structure 2 is a rigid platform consisting of a substantially corrugated panel. The recesses 10 between the adjacent corrugations constitute the cavities in which the tanks 1 are accommodated. A lip 21 runs around the perimeter of the panel to impart additional strength and rigidity.

In this embodiment, the body of the vehicle will be strongly attached to the corrugated panel to add the final amount of strength which will prevent flexure of the support structure. The corrugated panel of the one-piece platform may be made of any suitable material such as stamped steel, stamped aluminum, injection molded plastic with metal or composite reinforcement, all composite material or folded and riveted sheet metal.

In the embodiment of FIG. 4, the support structure of the chassis is a rigid platform comprising a cage formed of a plurality of struts 12. The interior of the cage forms the cavity in which the tanks 1 of compressed gaseous fuel are accommodated. Possible materials include welded steel or aluminum.

In this embodiment, the cage is six-sided, i.e. there are struts provided at the top, bottom and all four sides of the cage. In this case, a sufficient number of the struts are detachable to allow the tanks 1 to be removed from the cage for replacement and/or maintenance. For example, the struts forming the bottom of the cage are detachable from the struts forming the four sides of the cage by bolted connections or the like designated by the arrows in the figure.

Moreover, the spaces between the struts 12 themselves constitute the holes which expose each tank 1 to the ambient environment. Again, this not only prevents the buildup and confinement of any leaking gas, thereby preventing the possibility of an explosion, but also allows the tank(s) to be readily inspected.

Figure 5:
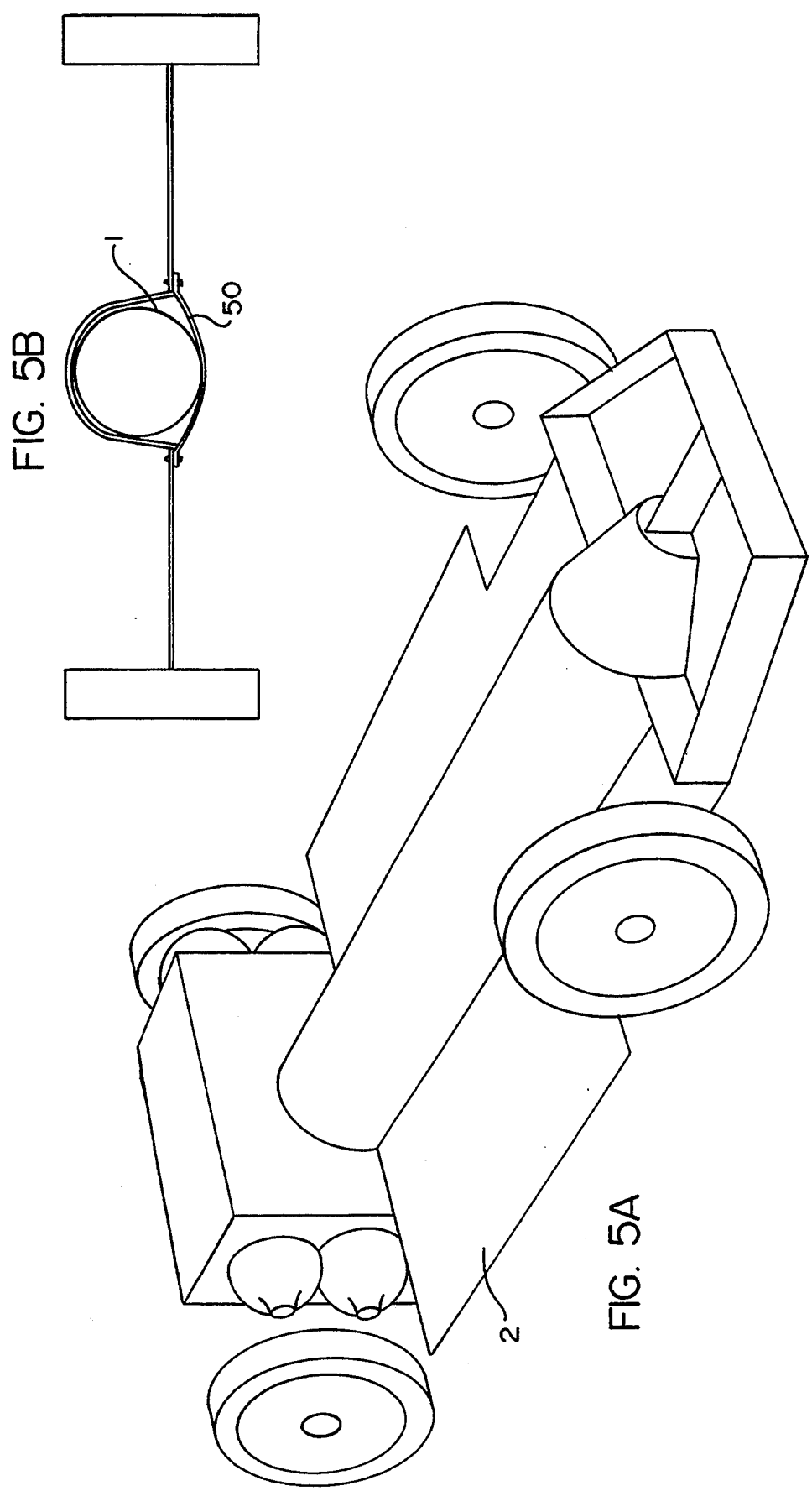
FIG. 5A is a perspective view of a fifth embodiment of an integrated chassis and compressed gaseous fuel system according to the present invention.
FIG. 5B is a cross-sectional view of the same.

In the embodiment of FIGS. 5A, 5B, the support structure 2 is a rigid platform consisting of a one-piece shell, commonly referred to as a monocoque. To make the monocoque shell, aluminum or steel sheets, with or without a honeycomb-like reinforcement structure, are folded and welded around the tank 1 of compressed gaseous fuel. An access door 50 is connected to the shell by bolts, for example. The door can be opened to expose the tank 1 for visual inspection. In this case, the tank 1 is not removable from the support structure 2, and the entire support structure/tank configuration must be replaced if the tank becomes damaged. The one-piece shell and/or access door is/are provided with a plurality of holes in order to allow any leaking gas to disperse to the ambient environment.

Although in each of the embodiments described so far, the tank(s) of compressed gaseous fuel extends longitudinally of the chassis, smaller tanks may be provided and accommodated in the support structure so as to extend transversely of the vehicle as shown at the rear of the chassis in FIG. 5A. Further, although the tanks 1 are generally cylindrical, the tanks could of course have other shapes in which case the cavity of the chassis would conform to such different shapes.

Figure 6:
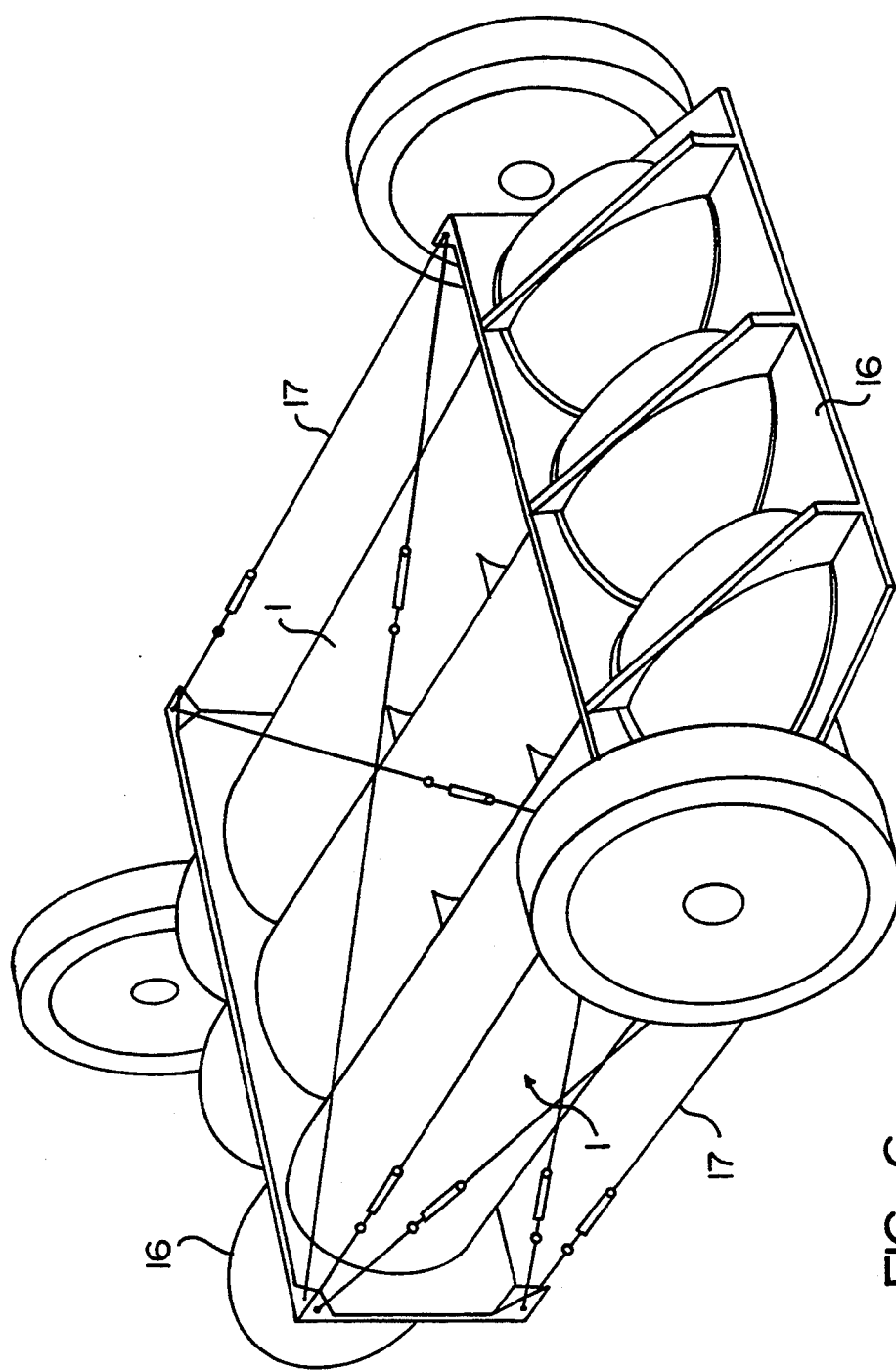
FIG. 6 is a perspective view of a sixth embodiment of an integrated chassis and compressed gaseous fuel system according to the present invention.

FIG. 6 shows an embodiment of the present invention which is comparatively lightweight. In this embodiment, at least two spaced apart supports 16, 16 each define recesses complementary to the shape of respective parts of the tanks, e.g. the ends of the tanks as shown in the figure. Each end of the tank is received in a recess of the support 16 complementary to the shape thereof. A series of elongate tensile members such as high strength cables and appropriate rigging tie these supports 16, 16 together to unite the tanks 1 and supports 16, 16. The tanks 1, supports 16, 16 and tensile members 17 together constitute a platform in which the tanks 1 form a load bearing portion, i.e. the structural integrity of the fuel cylinders provides the necessary strength and rigidity to the chassis. Of course, additional structural support members may be added to provide additional rigidity but at the expense of the lightweight property of this chassis.

As shown in the figure, significant portions of the tank 1 are exposed between the supports 16 whereby leaking gas may be dispersed to the ambient environment and the structural integrity of the tanks 1 can be inspected.

Although the present invention has been described in detail above with respect to certain preferred embodiments thereof, various changes and modifications will become apparent to those of ordinary skill in the art. All such changes and modifications are seen to be within the true spirit and scope of the invention as defined by the appended claims.

What is claimed is:

1. In an automotive vehicle, an internal combustion engine powering the vehicle, and an integrated chassis and compressed gaseous fuel system, said gaseous fuel system comprising at least one discrete tank of compressed gaseous fuel, and a fuel feed system connecting said at least one tank to the internal combustion engine; and said chassis being a support structure defining at least one cavity in which said at least one discrete tank of compressed gaseous fuel is accommodated, said support structure being a rigid platform including first and second structural support members detachably secured to one another, and at least one of said structural support members defining a recess which confronts the other of said support members and constitutes said cavity, whereby said at least one discrete tank of compressed gaseous fuel is interposed between said first and said second structural support members.

2. An integrated chassis and compressed gaseous fuel system of an automotive vehicle as claimed in claim 1, wherein said first and said second structural support members are disposed above and below said tank, respectively, each of said structural support members defining a said recess such that the recesses of said structural support members collectively form the cavity in which the at least one discrete tank of compressed gaseous fuel is accommodated.

3. An integrated chassis and compressed gaseous fuel system of an automotive vehicle as claimed in claim 1, wherein at least one of said structural support members defines at least one hole therein exposing each said tank to the ambient environment.

4. In an automotive vehicle, an internal combustion engine powering the vehicle, and an integrated chassis and compressed gaseous fuel system, said gaseous fuel system comprising at least one discrete tank of compressed gaseous fuel, and a fuel feed system connecting said at least one tank to the internal combustion engine; and said chassis being a support structure defining at least one cavity in which said at least one discrete tank of compressed gaseous fuel is accommodated, said support structure being a rigid platform consisting substantially of a corrugated panel, recesses defined between adjacent corrugations of said panel constituting said at least one cavity, whereby said tanks are disposed in said recesses.

5. An integrated chassis and compressed gaseous fuel system of an automotive vehicle as claimed in claim 4, wherein said support structure also includes brackets detachably secured to said panel and retaining said tanks in said recesses.

6. In an automotive vehicle, an internal combustion engine powering the vehicle, and an integrated chassis and compressed gaseous fuel system, said gaseous fuel system comprising at least one discrete tank of compressed gaseous fuel, and a fuel feed system connecting said at least one tank to the internal combustion engine; and said chassis being a support structure defining at least one cavity in which said at least one discrete tank of compressed gaseous fuel is accommodated, said support structure being a rigid platform comprising a cage formed of a plurality of struts, the interior of said cage constituting said cavity.

7. An integrated chassis and compressed gaseous fuel system of an automotive vehicle as claimed in claim 6, wherein said cage is six-sided and a sufficient number of said struts are detachable to allow each said tank to be removed from the cage.

8. An integrated chassis and compressed gaseous fuel system of an automotive vehicle as claimed in claim 6, wherein said one piece shell has at least one hole therein exposing each said tank to the ambient environment.

9. In an automotive vehicle, an internal combustion engine powering the vehicle, and an integrated chassis and compressed gaseous fuel system, said gaseous fuel system comprising at least one discrete tank of compressed gaseous fuel, and a fuel feed system connecting said at least one tank to the internal combustion engine; and said chassis being a support structure defining at least one cavity in which said at least one discrete tank of compressed gaseous fuel is accommodated, said support structure being a rigid one-piece shell.

10. An integrated chassis and compressed gaseous fuel system of an automotive vehicle as claimed in claim 9, and further comprising an access door connected to said shell, said door being openable to a position which exposes each said tank.

11. In an automotive vehicle, an internal combustion engine powering the vehicle, and an integrated chassis and compressed gaseous fuel system, said gaseous fuel system comprising at least one discrete tank of compressed gaseous fuel, and a fuel feed system connecting said at least one tank to the internal combustion engine; and said chassis being a support structure defining at least one cavity in which said at least one discrete tank of compressed gaseous fuel is accommodated, said support structure comprising at least two spaced apart supports each of which defines a recess complementary to the shape of a respective part of a said tank of compressed gaseous fuel, each said respective part of said tank being received in the recess complementary to the shape thereof, and a series of elongate tensile members tying said supports together, said at least one tank, said supports and said tensile members constituting a platform in which said at least one tank forms a load bearing portion of the platform.

12. In an automotive vehicle, an internal combustion engine powering the vehicle, and an integrated chassis and compressed gaseous fuel system, said gaseous fuel system comprising a plurality of cylindrical tanks of compressed natural gas, and a fuel fed system connecting each of said tanks to the internal combustion engine; and said chassis being a support structure defining at least one cavity in which said tanks of compressed natural gas are accommodated.

13. An integrated chassis and compressed gaseous fuel system of an automotive vehicle as claimed in claim 12, wherein said cylindrical tanks are disposed in parallel with the central longitudinal axes thereof extending longitudinally of said chassis.

* * * * *